United States Patent [19]
Mola et al.

[11] Patent Number: 6,125,030
[45] Date of Patent: Sep. 26, 2000

[54] VEHICLE OVERHEAD CONSOLE WITH FLIP DOWN NAVIGATION UNIT

[75] Inventors: John F. Mola, Lathrup Village; David Emerling, West Bloomfield; Guy L. Samuels, Jr., Detroit; Adam Canni, Auburn Hills; Walter M. Weiland, Holland; Dean T. Miller, Wyoming, all of Mich.

[73] Assignee: Lear Donnelly Overhead Systems L.L.C., Novi, Mich.

[21] Appl. No.: 09/131,149

[22] Filed: Aug. 7, 1998

[51] Int. Cl.[7] ..................................................... G06F 1/16
[52] U.S. Cl. .......................... 361/681; 345/169; 345/903; 345/905; 248/919; 296/37.8; 16/357; 16/360; 16/361
[58] Field of Search ..................................... 361/681, 683; 345/168, 905; 340/988, 995; 296/37.7, 37.8; 16/357, 360, 361; 403/84; 701/200, 207, 210

[56] References Cited

U.S. PATENT DOCUMENTS

| | | | |
|---|---|---|---|
| 4,867,498 | 9/1989 | Delphia et al. | 296/37.7 |
| 5,109,572 | 5/1992 | Park | 248/921 |
| 5,669,107 | 9/1997 | Carlsen et al. | 16/357 |
| 5,713,623 | 2/1998 | Mattingly | 296/37.7 |
| 5,775,762 | 7/1998 | Vitito | 296/37.7 |
| 5,823,599 | 10/1998 | Gray | 296/37.8 |
| 6,003,925 | 12/1999 | Litke et al. | 296/37.8 |
| 6,028,537 | 2/2000 | Suman et al. | 340/988 |

*Primary Examiner*—Leo P. Picard
*Assistant Examiner*—John Reed
*Attorney, Agent, or Firm*—Brooks & Kushman P.C.

[57] ABSTRACT

A vehicle overhead console assembly includes a console body with a door pivotally attached to the console body. The door is pivotally movable between open and closed positions. A navigation display unit is connected to the door such that the navigation display unit is exposed for viewing by a vehicle occupant when the door is in the open position, and hidden from view when the door is in the closed position.

13 Claims, 2 Drawing Sheets

VEHICLE OVERHEAD CONSOLE WITH FLIP DOWN NAVIGATION UNIT

TECHNICAL FIELD

The present invention relates to a vehicle overhead console having a navigation unit attached to a console door for storage and display.

BACKGROUND OF THE INVENTION

A popular feature in modern vehicles is the navigation unit which receives satellite signals for determining the location of the vehicle. Such devices, such as those offered by Magellan Driver Information Systems of Rochester Hills, Mich., include a keypad and display screen which displays a map, and provides navigational directions for reaching a desired destination.

Such devices are typically hand-held, or are prominently displayed on the vehicle instrument panel. The hand-held units may be inconvenient because they require handling while driving. Those units which are permanently displayed on the vehicle instrument panel may encourage theft of the unit.

Accordingly, it is desirable to provide a navigation unit in a vehicle in a position which is convenient for operator use, yet hidden from view when not in use to avoid theft.

DISCLOSURE OF INVENTION

The present invention overcomes the above-referenced shortcomings of prior art vehicle navigation display units by providing a navigation display unit which is secured to a door on a vehicle overhead console so that the unit may be displayed when the door is open and concealed when the door is closed. In a preferred embodiment, the navigation unit is a "micronav", which is a hand-held unit available from Magellan Driver Information Systems.

More specifically, the present invention provides a vehicle overhead console including a console body and a door pivotally attached to the console body. The door is pivotally movable between open and closed positions. A navigation display unit is connected to the door such that the navigation display unit is exposed for viewing by a vehicle occupant when the door is in the open position and hidden from view when the door is in the closed position.

Accordingly, an object of the invention is to provide a vehicle navigation unit attached to the inside of a vehicle overhead console door for user convenience and theft protection.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
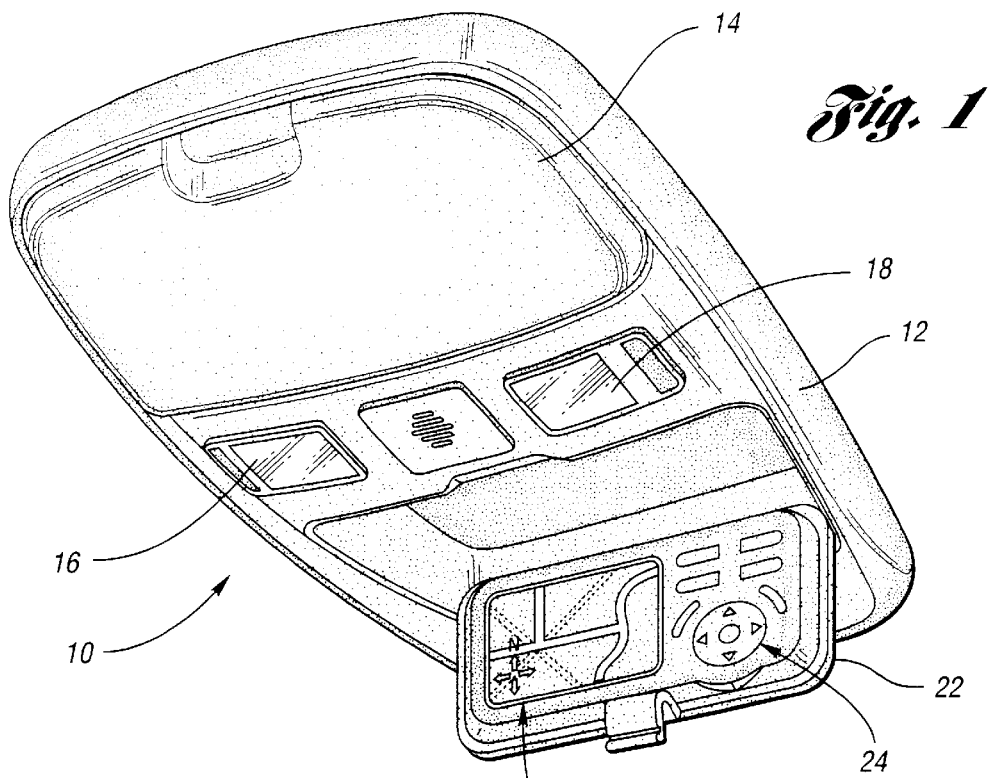
FIG. 1 shows a perspective view of a vehicle overhead console assembly in accordance with the present invention.

Referring to FIG. 1, a vehicle overhead console assembly 10 is shown in accordance with the present invention. The vehicle overhead console assembly 10 is adapted to be attached to an interior vehicle roof or headliner in a known manner. The vehicle overhead console assembly 10 includes a console body 12, which is typically an injection molded plastic component. A storage compartment door 14 and lights 16,18 are attached to the console body 12.

The present invention is particularly characterized by a navigation display unit 20 which is connected to the console door 22 for display and storage. The navigation display unit 20 is preferably a "micronav" hand-held unit, which is available from Magellan Driver Information Systems of Rochester Hills, Mich. A keypad 24 is also provided for operation. The keypad is also available from Magellan Driver Information Systems. The navigation display unit 20 may be attached to the door 22 in any known manner, such as attachment flanges, clips, screws, adhesive, hook-and-loop fastener, etc.

Figure 2:
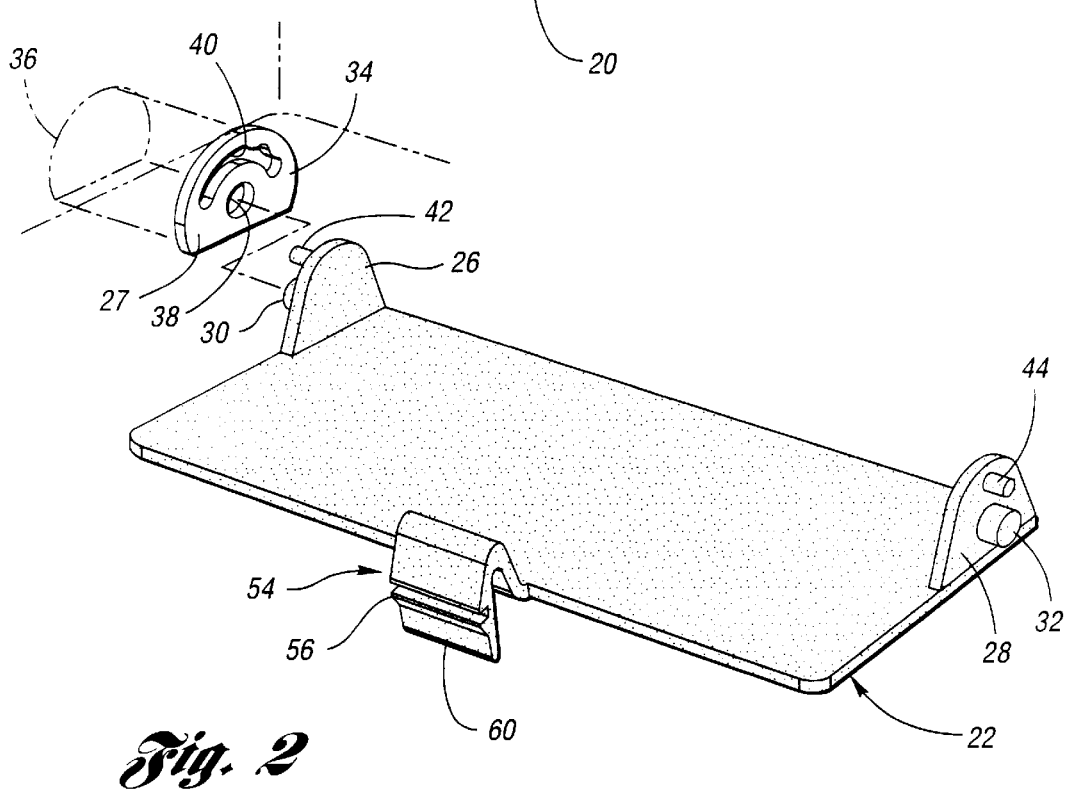
FIG. 2 shows an exploded perspective view of a console door and washer in accordance with the present invention.

As shown in FIG. 2, the door 22 includes upstanding flanges 26,28 having pivot knobs 30,32 extending therefrom, respectively. A washer 34 is preferably provided adjacent the flanges 26,28, and secured within an aperture 36 formed in the console body 12. Each washer 34 includes a central aperture 38 for receiving the respective pivot knob 30,32. The washer 34 is provided with a channel 40 formed therein for receiving the respective pin 42,44, which extends from the upstanding flanges 26,28, respectively. As the door 22 is pivoted with respect to the console body 12 about the pivot knobs 30,32, the pin 42 rides along the track 40.

Figure 3:
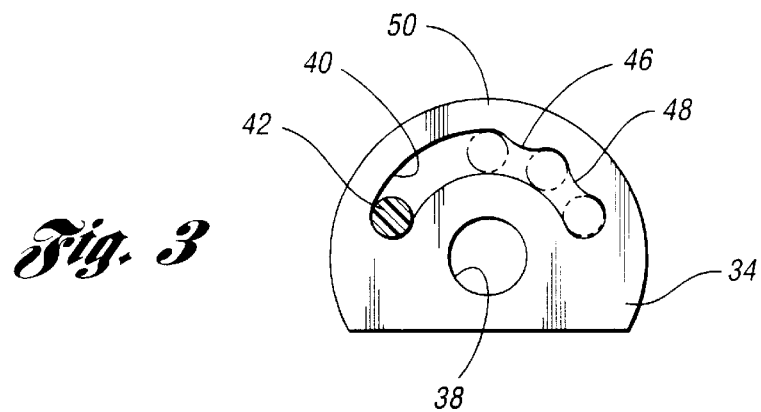
FIG. 3 shows a plan view of the washer shown in FIG. 2.
Figure 4:
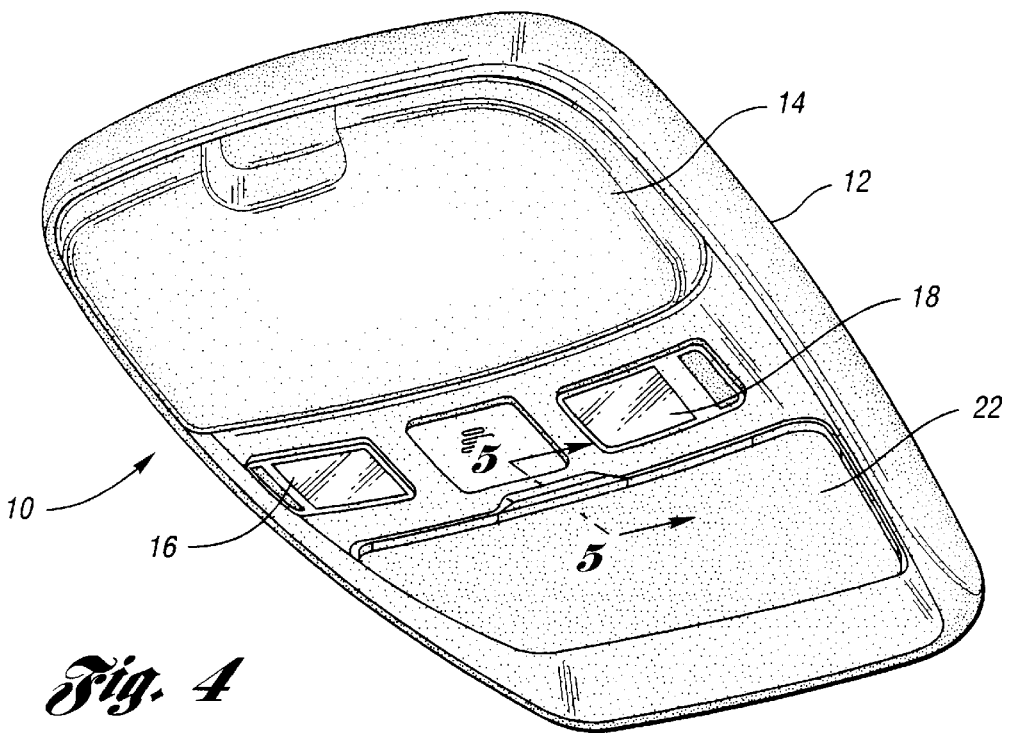
FIG. 4 shows a perspective view of the vehicle overhead console assembly of FIG. 1, with the console door in the closed position.

As shown in FIG. 3, the washer 34 includes a plurality of detents 46,48 which extend into the channel 40. Engagement of the pin 42 with or between the detents 46,48 holds the door 22 in the desired open position. The top portion 50 of the washer 34, which is preferably injection molded plastic, is sufficiently flexible to allow the pin 42 to pass over the detents 46,48 as the door 22 is pivoted. Appropriate clearance is provided in the top of the aperture 36, shown in FIG. 2, to allow such flexing motion of the top portion 50 of the washer 34 as the pin 42 passes the detents 46,48. Various positions of the pin 42 are shown in phantom in FIG. 3 to illustrate different angular positions of the door 22 for operator convenience.

Preferably, a damping fluid 27 (shown as a clear fluid in FIG. 2) is positioned between the abutting surfaces of the upstanding flanges 26,28 and the respective washer 34. The damping fluid is preferably a greasy lubricant, such as "Nyogel", which is available from Nye Lubricants of Fairhaven, Mass. Such a greasy lubricant will damp pivotal movement of the vehicle door 22 with respect to the console body 12. Such damping is needed because the navigation unit 20 adds substantial weight to the door 22, which may cause the door 22 to fall suddenly to the open position when unlatched without such damping fluid.

Figure 5:
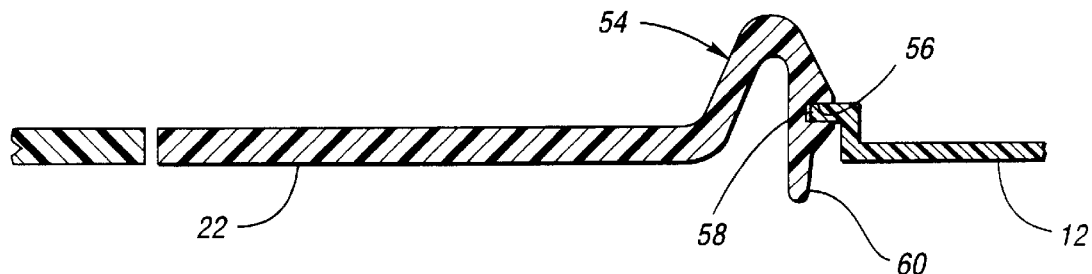
FIG. 5 shows a partial cross-sectional view taken at line 5—5 of FIG. 4.

As shown in FIGS. 2 and 5, the door 22 includes a substantially U-shaped flexible latch member 54, which is integrally molded with the door 22. The latch member 54 has a groove 56 formed therein which is engageable with an edge portion 58 of the console body 12, as shown in FIG. 5, for securing the door 22 in the latched position. A release button 60 is provided at a distal end of the U-shaped latch member 54 which flexes the U-shaped latch member for unlatching when the button 60 is pushed. In FIG. 5, the navigation unit is not shown.

While the best mode for carrying out the invention has been described in detail, those familiar with the art to which this invention relates will recognize various alternative designs and embodiments for practicing the invention within the scope of the appended claims.

What is claimed is:

1. A vehicle overhead console comprising:

a console body;

a door pivotally attached to the console body, and pivotally movable between open and closed positions; and a navigation display unit removably connected to the door such that the navigation display unit is exposed for viewing by a vehicle occupant when the door is in the open position and hidden from view when the door is in the closed position.

2. The vehicle overhead console of claim 1, wherein said navigation display unit comprises a display screen and a keypad.

3. The vehicle overhead console of claim 2, further comprising:

a flexible washer operatively connected between said door and console body, said flexible washer having a channel formed therein with at least one detent protruding into the channel; and a pin extending from the door for cooperation with said channel, whereby to adjust angular position of the door by engagement of the pin with said detent.

4. The vehicle overhead console of claim 3, wherein said washer is at least partially flexible to allow said pin to pass over said detent.

5. The vehicle overhead console of claim 1, wherein said console body comprises an edge portion and said door comprises a substantially U-shaped flexible latch member having a groove engageable with said edge portion for latching the door in the closed position and a release button for flexing the U-shaped latch member to unlatch the door.

6. The vehicle overhead console of claim 3, wherein said door comprises an upstanding flange positioned flat against said washer, and having a damping fluid positioned between said flange and washer for damping pivotal movement of the door.

7. A vehicle overhead console comprising:

a console body;

a door pivotally attached to the console body, and pivotally movable between open and closed positions;

a navigation display unit removably connected to the door such that the navigation display unit is exposed for viewing by a vehicle occupant when the door is in the open position and hidden from view when the door is in the closed position;

a flexible washer operatively connected between said door and console body, said flexible washer having a channel formed therein with at least one detent protruding into the channel; and a pin extending from the door for cooperation with said channel and engagement with the detent, whereby to adjust angular position of the door by engagement of the pin with said detent.

8. The vehicle overhead console of claim 7, wherein said navigation display unit comprises a display screen and a keypad.

9. The vehicle overhead console of claim 8, wherein said washer is at least partially flexible to allow said pin to pass over said detent.

10. The vehicle overhead console of claim 7, wherein said console body comprises an edge portion and said door comprises a substantially U-shaped flexible latch member having a groove engageable with said edge portion for latching the door in the closed position and a release button for flexing the U-shaped latch member to unlatch the door.

11. The vehicle overhead console of claim 8, wherein said door comprises an upstanding flange positioned flat against said washer, and having a damping fluid positioned between said flange and washer for damping pivotal movement of the door.

12. A vehicle overhead console comprising:

a console body;

a door pivotally attached to the console body, and pivotally movable between open and closed positions;

a navigation display unit removably connected to the door such that the navigation display unit is exposed for viewing by a vehicle occupant when the door is in the open position and hidden from view when the door is in the closed position; and a damping fluid operatively positioned between said door and console body for damping pivotal movement of the door with respect to the console body.

13. A vehicle overhead console comprising:

a console body;

a door pivotally attached to the console body, and pivotally movable between open and closed positions; and a navigation display unit removably connected to the door such that the navigation display unit is exposed for viewing by a vehicle occupant when the door is in the open position and hidden from view when the door is in the closed position.

* * * * *